United States Patent
Ohsugi

(10) Patent No.: US 7,782,352 B2
(45) Date of Patent: Aug. 24, 2010

(54) OPTICAL SCANNING DEVICE AND IMAGE FORMING APPARATUS

(75) Inventor: Tomoya Ohsugi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 227 days.

(21) Appl. No.: 11/355,137

(22) Filed: Feb. 16, 2006

(65) Prior Publication Data
US 2006/0187513 A1 Aug. 24, 2006

(30) Foreign Application Priority Data
Feb. 22, 2005 (JP) ............................. 2005-046110

(51) Int. Cl.
*B41J 15/14* (2006.01)
*B41J 27/00* (2006.01)
(52) U.S. Cl. ...................... 347/242; 347/257
(58) Field of Classification Search ................ 347/225, 347/231, 256–261, 241–245, 257, 263, 134; 359/196, 216
See application file for complete search history.

(56) References Cited

U.S. PATENT DOCUMENTS

| 6,195,190 B1 * | 2/2001 | Tachibe et al. ............... 359/216 |
| 6,333,756 B1 * | 12/2001 | Matsushita et al. .......... 347/134 |
| 6,750,997 B2 * | 6/2004 | Tamaru et al. ............... 359/196 |
| 7,446,910 B2 * | 11/2008 | Tamaru .......................... 358/474 |
| 2005/0062836 A1 * | 3/2005 | Nakajima ..................... 347/225 |

FOREIGN PATENT DOCUMENTS

| JP | 6-148553 A | 5/1994 |
| JP | 10-232360 A | 9/1998 |
| JP | 11-183832 | 7/1999 |
| JP | 2001-330791 | 11/2001 |
| JP | 2002350753 A | * 12/2002 |
| JP | 2003-248186 A | 9/2003 |
| JP | 2005305964 A | * 11/2005 |
| JP | 2006-154656 | 6/2006 |

OTHER PUBLICATIONS

Copy of Japanese Office Action dated May 25, 2010.

* cited by examiner

*Primary Examiner*—Hai C Pham
(74) *Attorney, Agent, or Firm*—Dickstein Shapiro LLP

(57) ABSTRACT

An optical scanning device that uses a light spot to scan an image surface with a light source, a deflector, and an imaging element includes a housing in which the light source, the deflector, and the imaging element are set. The housing includes at least two sidewalls opposed to each other, a bottom surface that extends substantially perpendicular to the sidewalls, and ribs that are substantially perpendicular to the bottom surface and formed to extend from the two sidewalls, respectively. Discontinuous sections (sections between ribs or notched sections of the ribs) for passing light beams are provided in the ribs. A reinforcing member separate from the ribs are bridged to the discontinuous sections.

7 Claims, 9 Drawing Sheets

| YOUNG'S MODULUS | $8 \times 10^9 \, N/m^2$ |
|---|---|
| POISSON RATIO | 0.3 |
| DENSITY | 1400 g/m3 |
| THICKNESS | 3 mm |

OPTICAL SCANNING DEVICE AND IMAGE FORMING APPARATUS

CROSS-REFERENCE TO RELATED APPLICATIONS

The present document incorporates by reference the entire contents of Japanese priority document, 2005-046110 filed in Japan on Feb. 22, 2005.

BACKGROUND OF THE INVENTION

1. Field of the Invention

The present invention relates to an optical scanning device and an image forming apparatus using the optical scanning device, and, more particularly to a setting structure for optical elements.

2. Description of the Related Art

In an image forming apparatus like a copying machine, a printer, or a facsimile apparatus, an optical scanning device using a light beam like a laser beam may be used as one of devices that form an electrostatic latent image on a photosensitive member used as a latent image bearing member (see, for example, Japanese Patent Application Laid-Open No H6-148553 (paragraph 0002) and Japanese Patent Application Laid-Open No. H10-232360 (paragraph 0004)).

On the other hand, there is an apparatus using an electrophotographic technology like a digital copying machine or a laser printer that are a kind of an image forming apparatus. The apparatus uses light spot to scan a photosensitive member in a direction perpendicular to the moving direction of the photosensitive member with an optical scanning device to write a latent image on the photosensitive member, develops the latent image using a toner, transfers a toner image on paper, heats the toner with a fixing device, and forms an image on the paper. There is also a tandem color image forming apparatus or the like that performs image forming processes for a plurality of colors in parallel using a plurality of photosensitive members and developing devices to form a color image at high speed (see, for example, Japanese Patent Application Laid-Open No. 2003-248186 (paragraphs 0005 and 0041).

An optical scanning device used in such an image forming apparatus uses a semiconductor laser as a light source, shapes a light beam emitted from the semiconductor laser with a first imaging element like a collimator lens or a cylindrical lens and, then, deflects the light beam with a deflector like a polygon scanner, focuses the light beam on an image surface as a light spot via a second imaging element like an fθ lens or an optical face tangle error correction lens of the deflector, and uses the light beam to scan the image surface. The optical scanning device is often reduced in size and an arrangement position of the optical scanning device in the image forming apparatus is often optimized by inserting a mirror in an optical path from the light source to the image surface to bend the optical path.

As the optical scanning device in the image forming apparatus of the tandem system, there is an optical scanning device that uses a light beam to scan four photosensitive members, respectively. In such an optical scanning device, since only one expensive deflector has to be used, there is an advantage that it is possible to manufacture the optical scanning device at low cost (see, for example, Japanese Patent Application Laid-Open No. 2003-248186 (paragraphs 0005 and 0041)).

In an optical writing device disclosed in Japanese Patent Application Laid-Open No. 2003-248186, optical elements like a lens and a mirror, a deflector, and the like used for the optical writing device are set in an optical box forming a closed space to prevent pollution of an optical surface due to dust from the outside.

In the optical scanning device including the optical elements and the deflector located in the optical box having the closed space, vibration may be caused and transmitted to the optical box when a rotary polygon mirror used as the deflector is driven to rotate at high speed by a motor. The vibration of the optical box induces vibration in support sections of respective optical elements. As a result, positions and postures of the optical elements positioned in predetermined positions in the optical box fluctuate. It is likely that this causes deterioration in an output image because of fluctuation in a position and a shape of a light spot focused on an image surface. In particular, in the constitution disclosed in Japanese Patent Application Laid-Open No. 2003-248186, that is, the constitution in which a light beam is changed to four light beams by one deflector and guided to optical paths to respective imaging surfaces to realize a reduction in cost, it is necessary to store all the optical elements in the optical box. Thus, a size of the optical box is increased.

Therefore, since a span between frames used in supporting the optical box in the image forming apparatus is extended, it may be difficult to secure rigidity against vibration. Moreover, in such an optical scanning device, the elements significantly affecting optical characteristics such as the deflector and the fθ lens are arranged in the center of the optical box that is most easily vibrated, that is, a position where largest bending deformation occurs among support spans in the support frames. Thus, the vibration of the optical box tends to affect an output image.

In Japanese Patent Application Laid-Open No. 2003-248186, rigidity of the optical box is improved by providing reinforcing ribs to prevent such a deficiency from occurring. However, when the reinforcing ribs are provided among the spans of the support frames, the reinforcing ribs are also located near the deflector. Therefore, to prevent a light beam from the deflector from being blocked by the reinforcing ribs, a part of the reinforcing ribs located near the deflector are removed or notches are provided in the reinforcing ribs. Such a constitution leads to lack of portions where rigidity against vibration is improved near the deflector. This limits an effect of the reinforcing ribs against vibration.

SUMMARY OF THE INVENTION

It is an object of the present invention to at least solve the problems in the conventional technology.

According to one aspect of the present invention, the optical scanning device that uses a light spot to scan a surface of an image with a light source, a deflector, and an imaging element, includes a housing in which the light source, the deflector, and the imaging element are set, wherein the housing includes at least two sidewalls opposed to each other, a bottom surface that extends substantially perpendicular to the sidewalls, and ribs that are substantially perpendicular to the bottom surface and formed to extend from the two sidewalls, respectively, and wherein the ribs are formed with discontinuous sections including a notched portion for passing light beams, and a reinforcing member which is separate from the ribs, bridging across the discontinuous sections.

According to another aspect of the present invention, an optical scanning device including a light source and a deflector set in a housing to use a light spot to scan a surface of an image with the light source, the deflector, and an imaging element is constructed such that the housing includes at least two sidewalls opposed to each other, a bottom surface that extends substantially perpendicular to the sidewalls, and ribs that are substantially perpendicular to the bottom surface and connect the two sidewalls, and wherein the ribs are formed integrally with openings through which light beams traveling from the light source to the deflector and light beams deflected by the deflector pass.

According to still another aspect of the present invention, an image forming apparatus that uses a light spot to scan an image bearing member to write an image on the image bearing member to form an image is configured to use an optical scanning device, which uses a light spot to scan a surface of an image with a light source, a deflector, and an imaging element set within a housing, wherein the housing includes at least two sidewalls opposed to each other, a bottom surface that extends substantially perpendicular to the sidewalls, and ribs that are substantially perpendicular to the bottom surface and formed to extend from the two sidewalls, respectively, and wherein the ribs are formed with discontinuous sections, including a notched portion for passing light beams are provided in the ribs, and a reinforcing member which is separate from the ribs, bridging across the discontinuous sections.

According to still another aspect of the present invention, an image forming apparatus that uses a light spot to scan an image bearing member to write an image on the image bearing member to form an image is configured to use an optical scanning device, which includes a light source and a deflector set in a housing to use a light spot to scan a surface of an image with the light source, the deflector, and an imaging element, wherein the housing includes at least two sidewalls opposed to each other, a bottom surface that extends substantially perpendicular to the sidewalls, and ribs that are substantially perpendicular to the bottom surface and connect the two sidewalls, and wherein the ribs are formed integrally with openings through which light beams traveling from the light source to the deflector and light beams deflected by the deflector pass.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail below with reference to the accompanying drawings.

Figure 1:
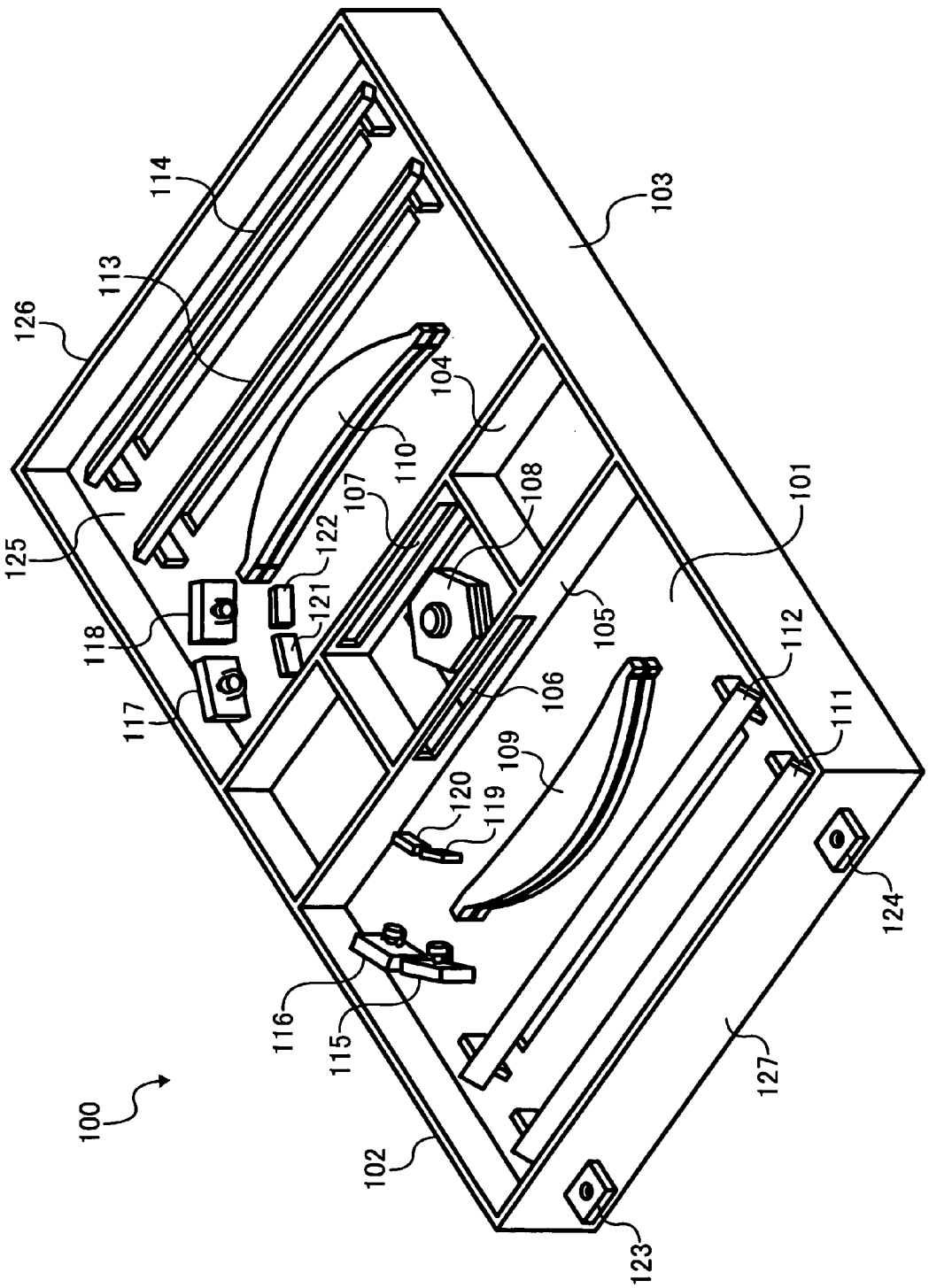
FIG. 1 is a diagram of a constitution of an optical scanning device according to an embodiment of the present invention.

FIG. 1 is a diagram of one of optical scanning devices according to an embodiment of the present invention. In the figure, an optical scanning device 100 includes an optical box 101 as a main component. The optical box 101 is surrounded by first sidewalls 102 and 103 located to be opposed to each other and second sidewalls 126 and 127 opposed to each other in a direction perpendicular to the first sidewalls. The respective sidewalls are integrated with and fixed to a bottom surface 125.

In the bottom surface 125, a plurality of light source units 115 to 118 and a plurality of cylindrical lenses 119 to 122 are arranged in necessary portions. A polygon scanner 108 serving as a deflector is arranged substantially in the center of the bottom surface 125. Light beams emitted from the light source units 115 to 118 are deflected by the polygon scanner 108 to be used for scanning.

In the polygon scanner 108, rotary mirrors including six reflective surfaces are stacked in upper and lower two stages. The light source units 115 and 116 and the light source units 117 and 118 are arranged in the positions which are shifted from each other in a sub-scanning direction.

fθ lenses 109 and 110 stacked in upper and lower two stages and mirrors 111 to 114 returning light beams toward below the bottom surface 125 are arranged in positions where light beams deflected and used for scanning in the polygon scanner 108 are emitted. In positions on the bottom surface 125 corresponding to the mirrors 111 to 114, as shown in FIG. 2, openings 335 to 338 through which light beams are passed toward photosensitive members 331 to 334 serving as image bearing members arranged below the bottom surface 125 are provided.

Figure 2:
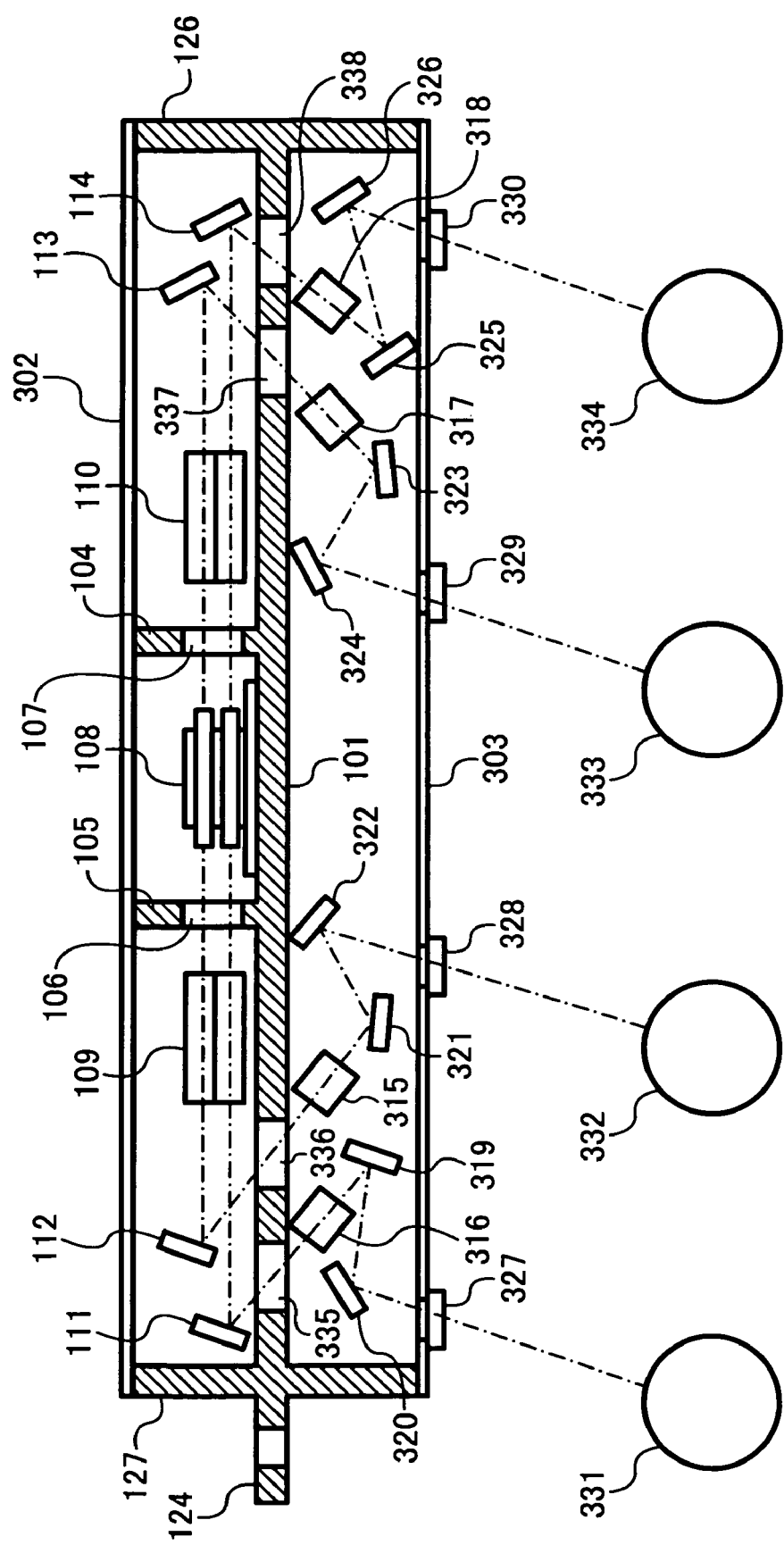
FIG. 2 is a diagram of a sectional constitution of the optical scanning device shown in FIG. 1.

In FIG. 2, lenses 315 to 318 and mirrors 319 to 326 that converge light beams toward the photosensitive members 331 to 334 are arranged below the bottom surface 125.

On upper and lower surfaces of the optical box 101, covers denoted by reference numerals 302 and 303 in FIG. 2 are attached to cover the inside of the optical box 101 and prevent dust from entering the optical box 101 from the outside. On the cover 303 located on the lower surface side of the optical box 101, pieces of glass 327 to 330 are provided in openings through which light beams can be irradiated toward the photosensitive members. The pieces of glass 327 to 330 allow irradiation of light beams while preventing dust from entering the optical box 101.

Although not shown in the figure, a charging device, a developing device, a transfer device, and a cleaning device for performing image formation according to a well-known electrophotographic method are arranged around the photosensitive members 331 to 334. These devices make it possible to transfer visible images formed on the respective photosensitive members onto a recorded medium like a recording sheet to be superimposed one on top of another to form a full-color image. The recording sheet having the full-color image formed thereon is discharged to the inside or the outside of the image forming apparatus through a not-shown fixing device.

In FIG. 1, the optical box 101 includes fixing flanges (only fixing flanges provided on the one sidewall 127 are shown in FIG. 1) 123 and 124 provided near four corners of the sidewalls. The optical box 101 is fastened and fixed to attaching sections of the optical scanning device provided in the image forming apparatus.

In the optical box 101 shown in FIG. 1, ribs 104 and 105 are provided. The ribs 104 and 105 are perpendicular to the bottom surface 125 near a setting position of the polygon scanner 108 serving as a deflector and are connected to the two sidewalls 102 and 103 with ends in a longitudinal direction thereof formed integrally with the sidewalls 102 and 103, respectively.

The ribs 104 and 105 form walls that can surround the polygon scanner 108. Discontinuous sections for passing light beams are provided in a part of the wall opposed to the fθ lens side. The discontinuous sections are formed by openings 106 and 107 in FIG. 1. Peripheries of the openings, in particular, peripheries of the openings in the vertical direction are continuous. As the openings 106 and 107, as shown in FIG. 1, it is also possible to form an opening (a window) serving as a section, through which light beams made incident on the polygon scanner 108 pass, and an opening (a window) serving as a section, through which light beams deflected by the polygon scanner 108 pass, in different positions in the ribs 104 and 105.

Figure 3:
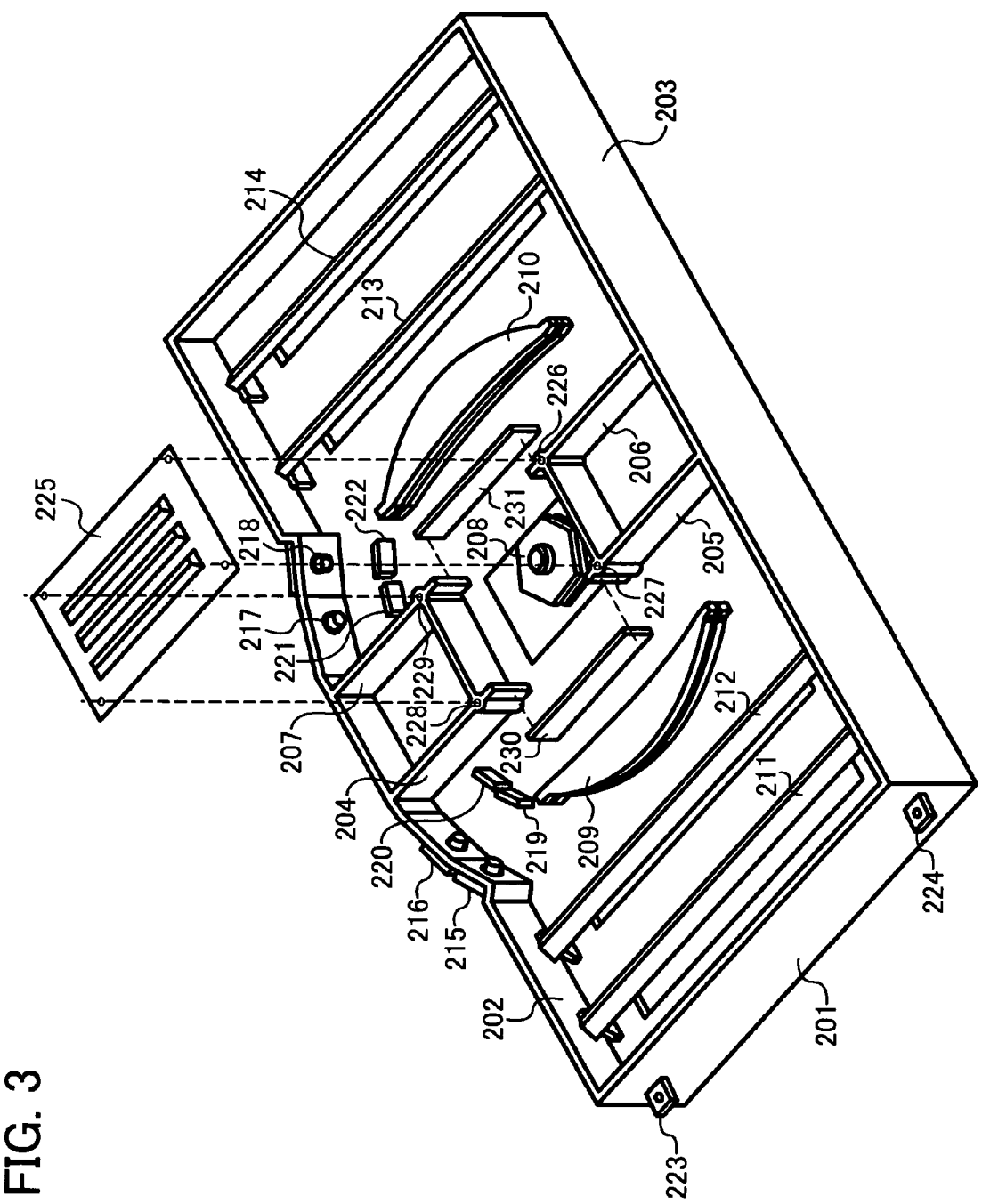
FIG. 3 is a diagram of a modification of a main part of the optical scanning device shown in FIG. 1.

FIG. 3 is a diagram of a modification of a main part of the optical scanning device. In an optical box 201 in the figure, four light source units 215 to 218 are radially arranged around a polygon scanner 208 serving as a deflector. The light source units 215 to 218 are attached to a first sidewall 202. Optical elements for leading light beams emitting from the light source units 215 to 218 to photosensitive members are arranged in the same manner as those shown in FIG. 1 with respect to the polygon scanner 208.

The first sidewall 202 is bent according to the arrangement of the light source units 215 to 218.

On the other hand, ribs 204 and 205 are provided on the sidewall 202 and a sidewall 203 opposed to the sidewall 202 to connect the sidewalls.

The ribs 204 and 205 are made discontinuous near the polygon scanner 208 in the middle of extension between the sidewalls. This allows light beams traveling from the light source units to the polygon scanner 208 and light beams deflected by the polygon scanner 208 to pass through sections where the ribs 204 and 205 are made discontinuous.

In the discontinuous sections in the ribs 204 and 205, an iron cover 225 is fixed as a reinforcing member separate from the ribs to cover the sections.

The iron cover 225 is integrated with bosses 226 to 229 provided at corners of the discontinuous sections of the ribs 204 and 205 by fastening or bonding. In the discontinuous sections in the ribs 204 and 205, glass 230 is pressed against and fixed to a position, which serves as a port for incidence of light beams on and emission of light beams from the polygon scanner 208, by a leaf spring (now shown) or the like. Consequently, a space around the polygon scanner 208 is substantially sealed. This makes it possible to prevent noise such as wind sound caused at the time of rotation of the polygon scanner 208 from leaking to the outside. Moreover, this makes it possible to reduce fluctuation in characteristics of fθ lenses 209 and 210 that is likely to be caused by propagation of heat generated by the polygon scanner 208 to the outside.

In this embodiment, when an experiment concerning reduction in vibration in the center of an optical box is performed in the optical scanning device including the ribs shown in FIGS. 1 to 3, results described below are obtained.

Figure 4:
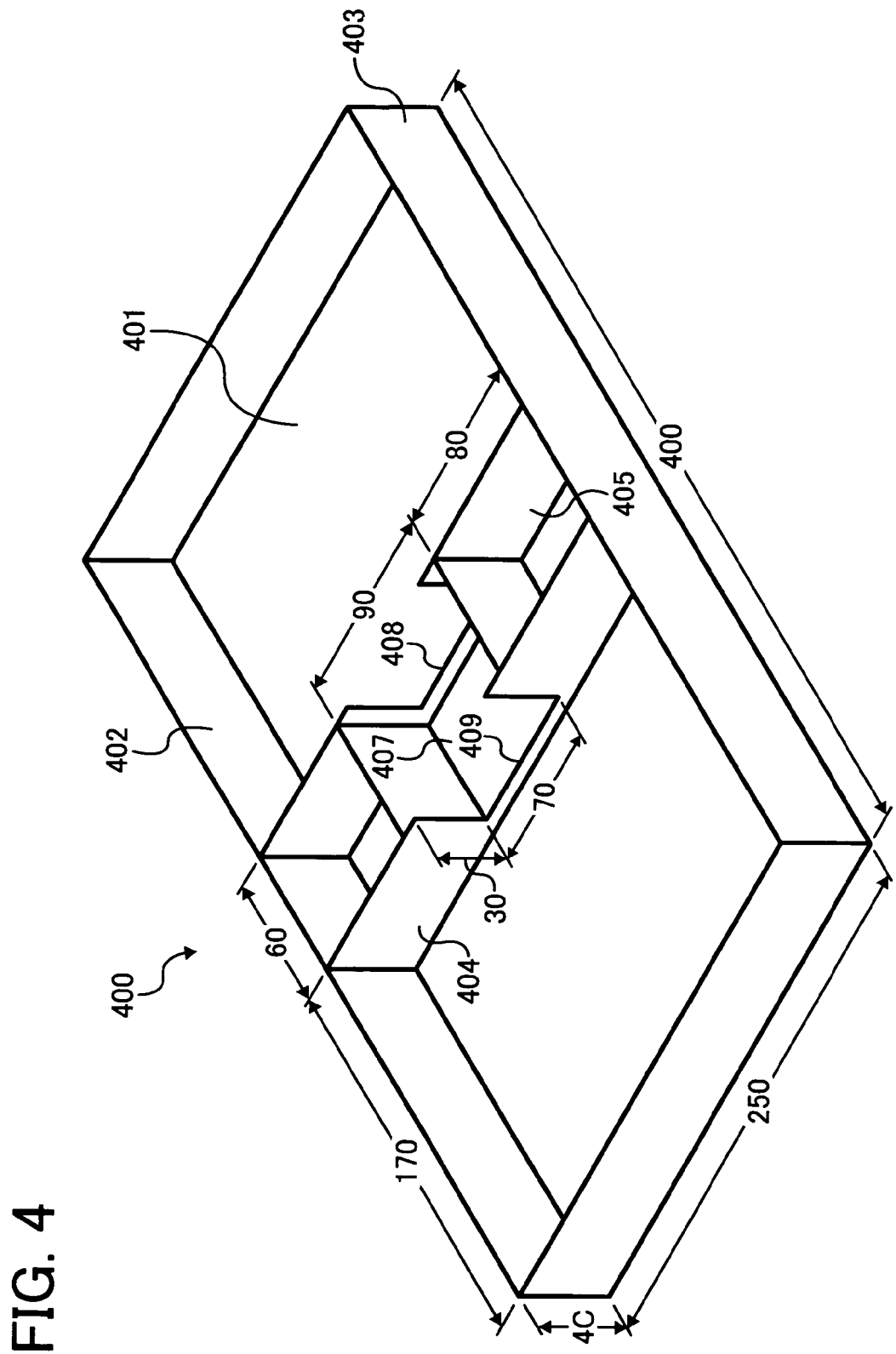
FIG. 4 is a diagram of an optical scanning device according to a conventional technology used for a vibration simulation that is shown as a comparative example.

In performing the experiment, as a comparative example of the optical box according to this embodiment, an optical box having a shape shown in FIG. 4 was assumed and a vibration simulation was performed for the optical box. Underlined numbers in FIG. 4 indicate dimensions (unit: mm). Among reference numerals shown in FIG. 4, reference numeral 400 denotes an optical box; 401, a bottom surface; 402 and 403, first sidewalls; 404 and 405, ribs extending to the first sidewalls 402 and 403; and 408 and 409, discontinuous sections provided in a part of the ribs.

Figure 5:
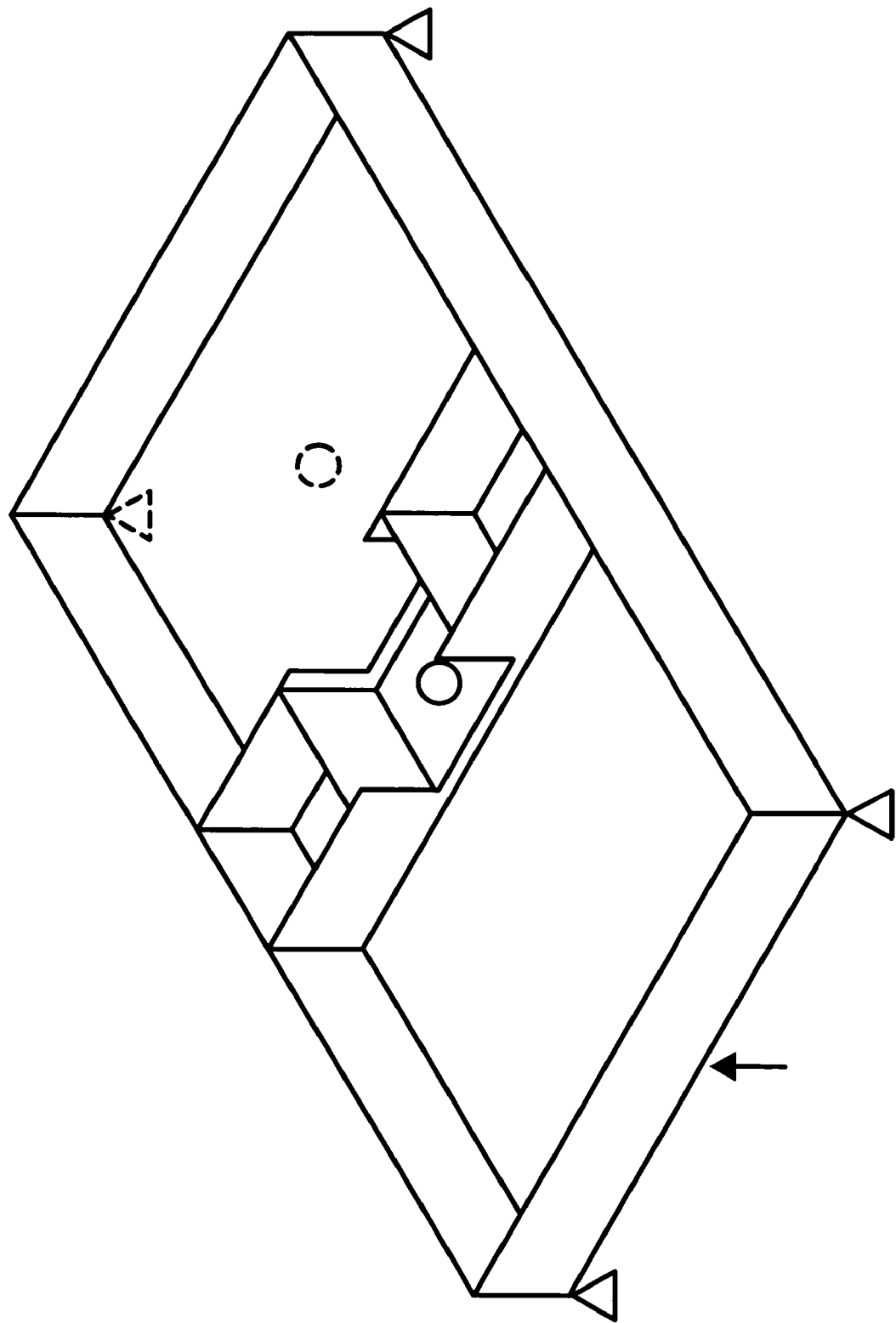
FIG. 5 is a diagram for explaining restraints in carrying out the vibration simulation for the optical scanning device shown in FIG. 4.
Figures 6, 7:
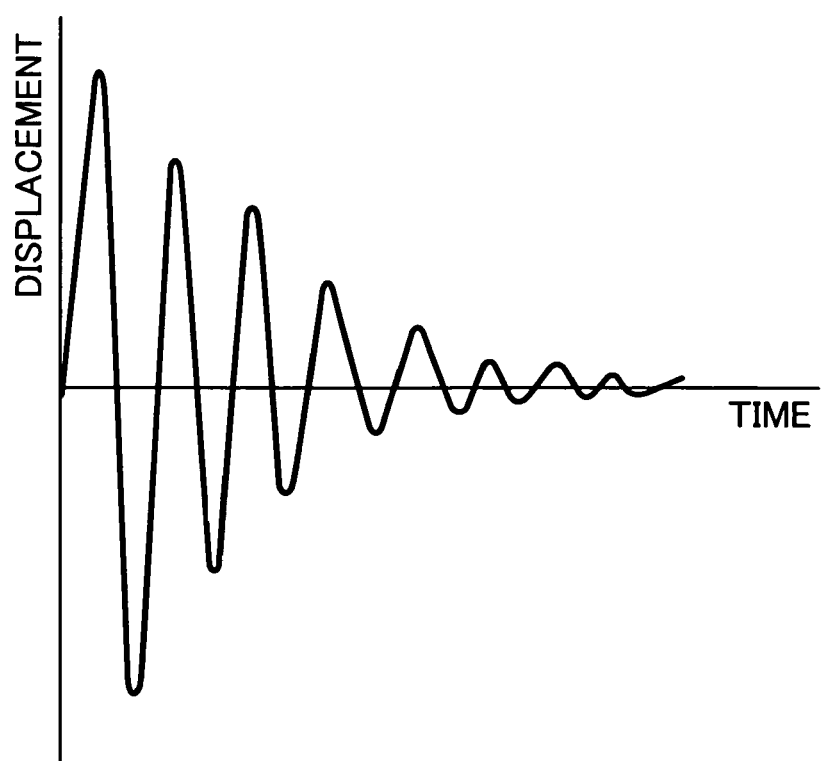
FIG. 6 is a table of constants of a material of an optical box used for the restraints shown in FIG. 5.
FIG. 7 is a graph of a result obtained by subjecting data of displacement at respective nodes of the optical box used in the vibration simulation to frequency analysis according to the Fourier transformation.

Restraints in the simulation are as shown in FIG. 5. Assuming that the optical box was screwed at four corners, the optical box was restrained at six degrees of freedom (three in a translation direction and three in a rotation direction). As an external force serving as a trigger of vibration, assuming an instantaneous impact like an impact of a hammer, a force of 50 Newton was inputted to a position indicated by an arrow in FIG. 5 in a triangular pulse shape. Constants of a material of the optical box used for the simulation are shown in FIG. 6.

These are values of a resin material that is generally used as a material of an optical box. In general, the finite element method is used in a vibration simulation. However, in this experiment, triangular shell elements were adopted as elements and a model of the optical box in FIG. 4 was divided into about 1400 elements.

Figure 8:
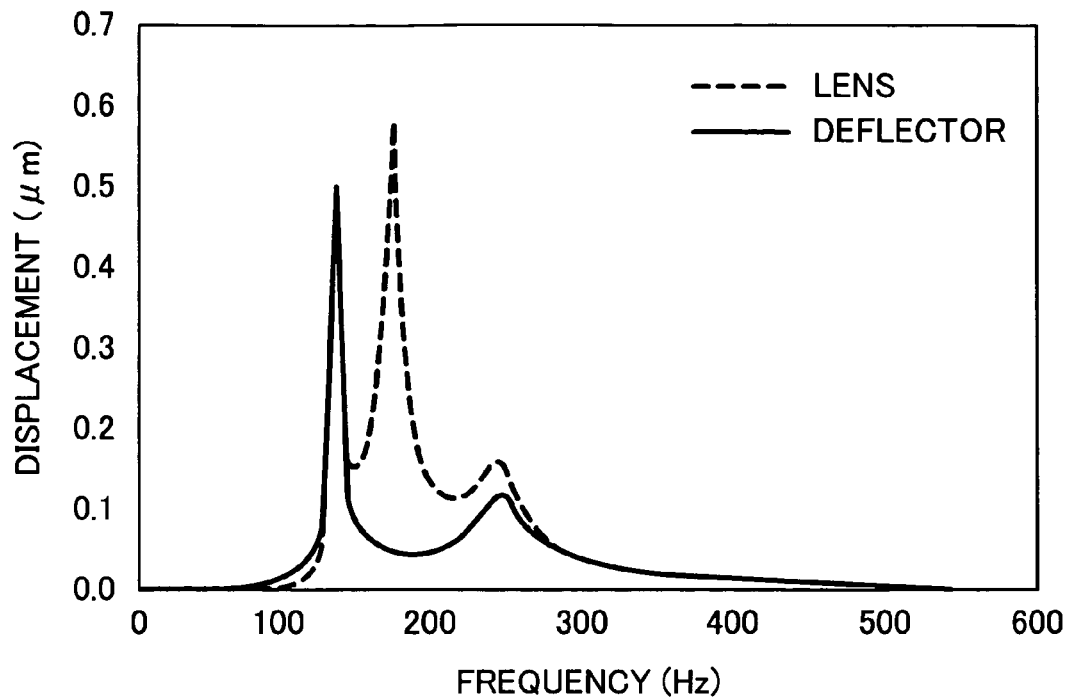
FIG. 8 is a graph of an amount of vibration displacement at measurement points in the conventional optical box shown in FIG. 5.

Results obtained by performing the vibration simulation under the conditions described above are shown in FIG. 8. When the vibration simulation is performed, data of displacement with respect to time shown in FIG. 7 is obtained for respective nodes. Results obtained by subjecting the data to frequency analysis according to the Fourier transformation are shown in FIG. 7. In FIG. 8, displacement in the vertical direction at two points indicated by circles in FIG. 5, that is, a deflector attaching portion (the center of the optical box) and an fθ lens attaching portion is shown.

Figure 9:
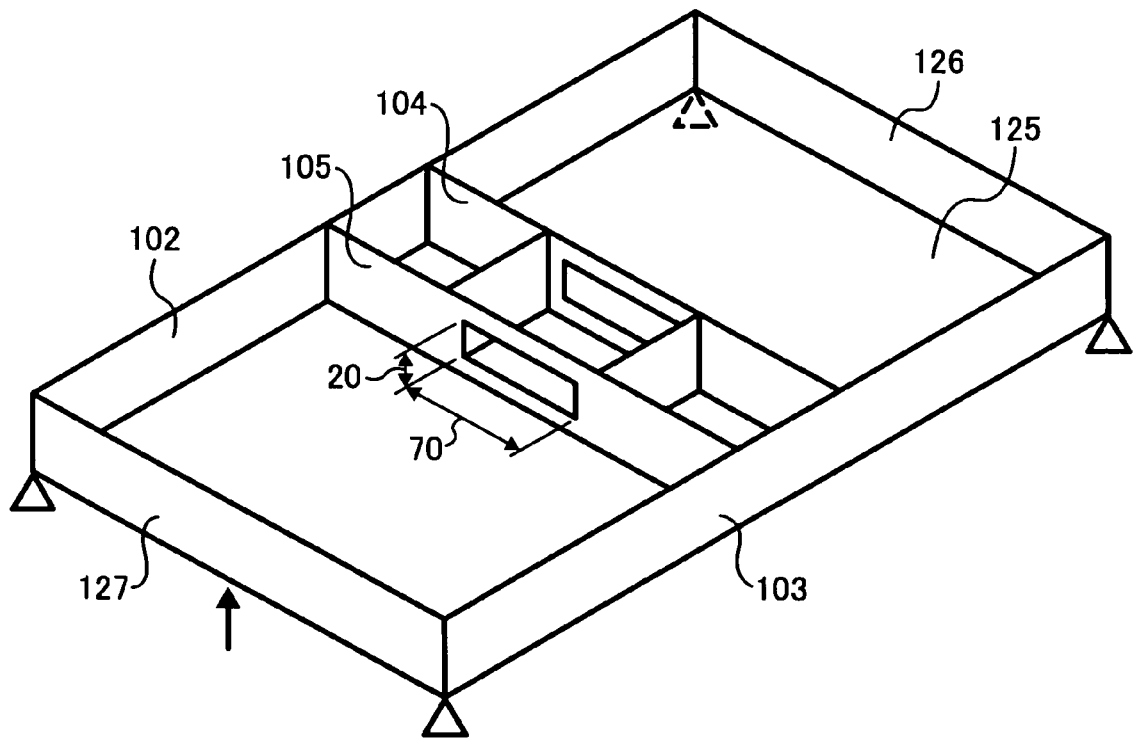
FIG. 9 is a diagram of a constitution of an optical box for carrying out a vibration simulation for the optical scanning device shown in FIG. 1.

On the other hand, a shape equivalent to the optical box provided with openings in a part of the ribs shown in FIG. 1 was assumed as a constitution of the optical box in this embodiment (see FIG. 9). A vibration simulation was performed for the optical box. In other words, the vibration simulation was performed for an optical box having rectangular openings in ribs. An external shape of the optical box, positions of the ribs, and the like are the same as those shown in FIG. 4.

Figure 10:
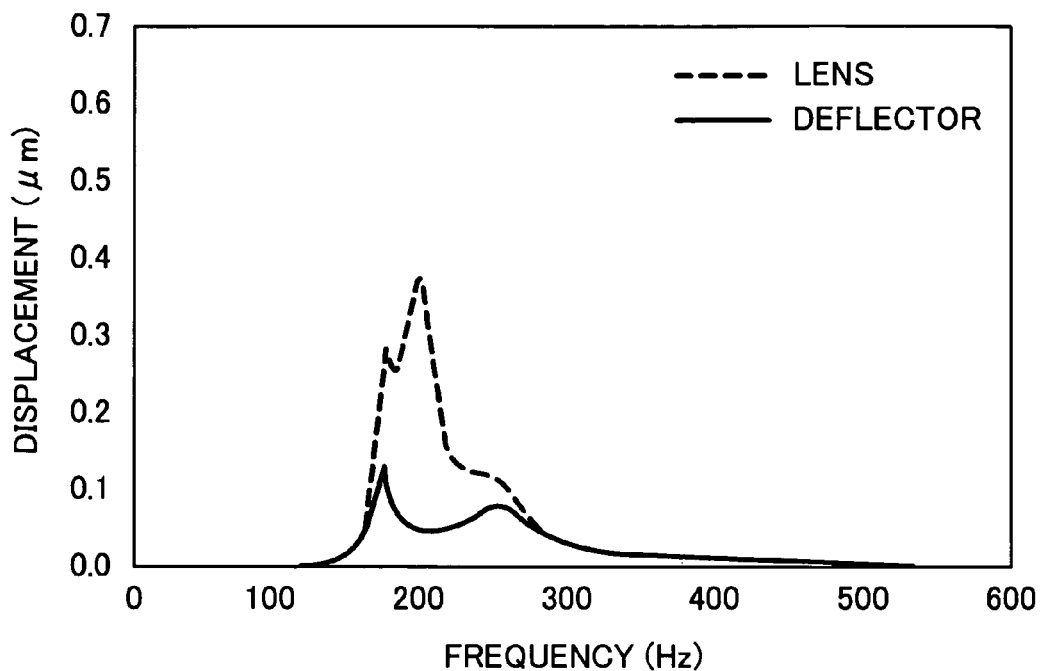
FIG. 10 is a graph of an amount of vibration displacement at measurement points in the optical box shown in FIG. 9.

Results obtained by performing the vibration simulation for the model shown in FIG. 9 are shown in FIG. 10.

As shown in FIG. 10, in the simulation results in this embodiment, it is seen that, compared to the results of the vibration simulation for the optical box according to the conventional technology shown in FIG. 8, height of peaks of vibration is significantly reduced in both the deflector attaching portion and the fθ lens attaching portion.

Figure 11:
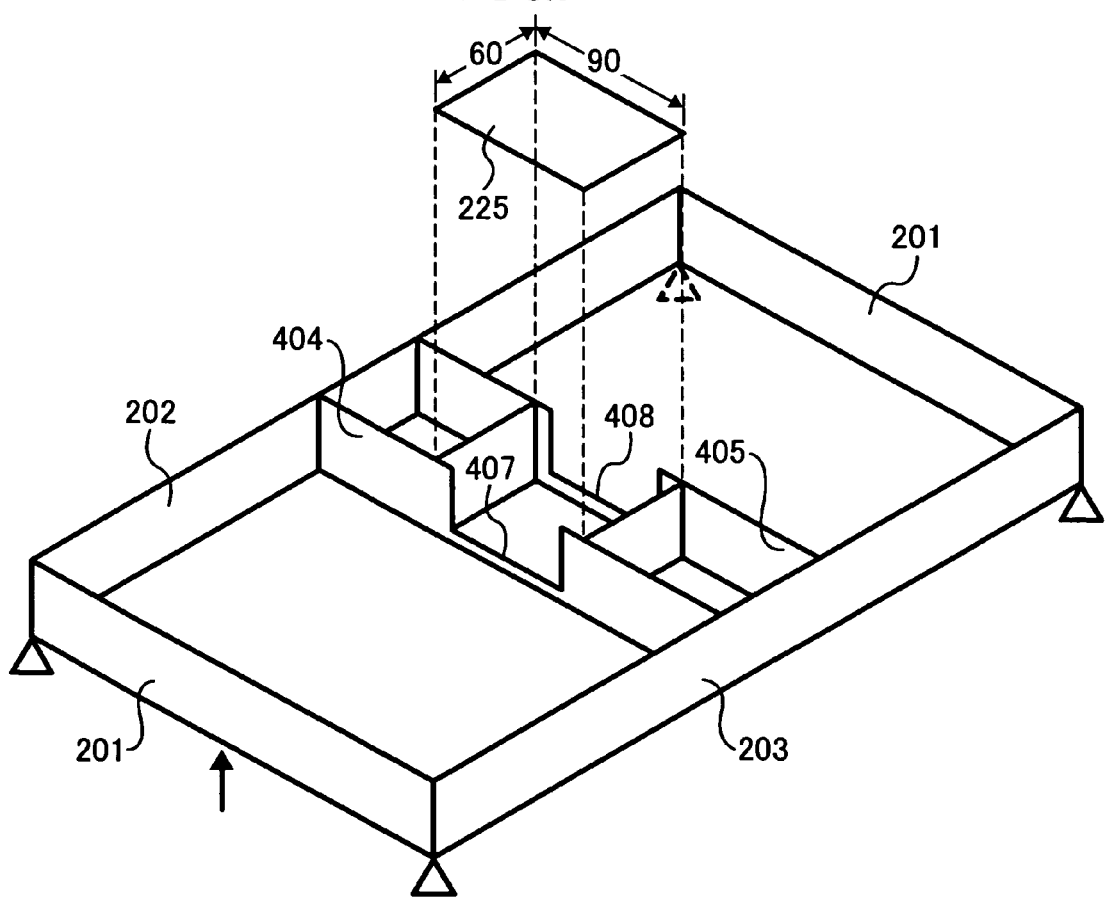
FIG. 11 is a diagram of a constitution for performing a vibration simulation for an optical box shown in FIG. 3.

A constitution in FIG. 11 equivalent to the constitution in which a part of the ribs are discontinuous as shown in FIG. 3 was assumed as a constitution of the optical box in this embodiment. A vibration simulation was performed for the optical box.

In FIG. 11, a shape of the optical box is the same as that shown in FIG. 3. Discontinuous sections are formed in a part of the ribs as in the case shown in FIG. 4. In this constitution, a cover having a size 60 mm×90 mm×3 mm (thickness) is added to the discontinuous sections. A material of the cover was assumed to be the same as that of the optical box. It was assumed that four corners of the cover were screwed to the ribs of the optical box. In the vibration simulation, four corners of the optical box were linked to positions shown in FIG. 11 under conditions of restrains of six degrees of freedom (three in a translation direction and three in a rotation direction).

Figure 12:
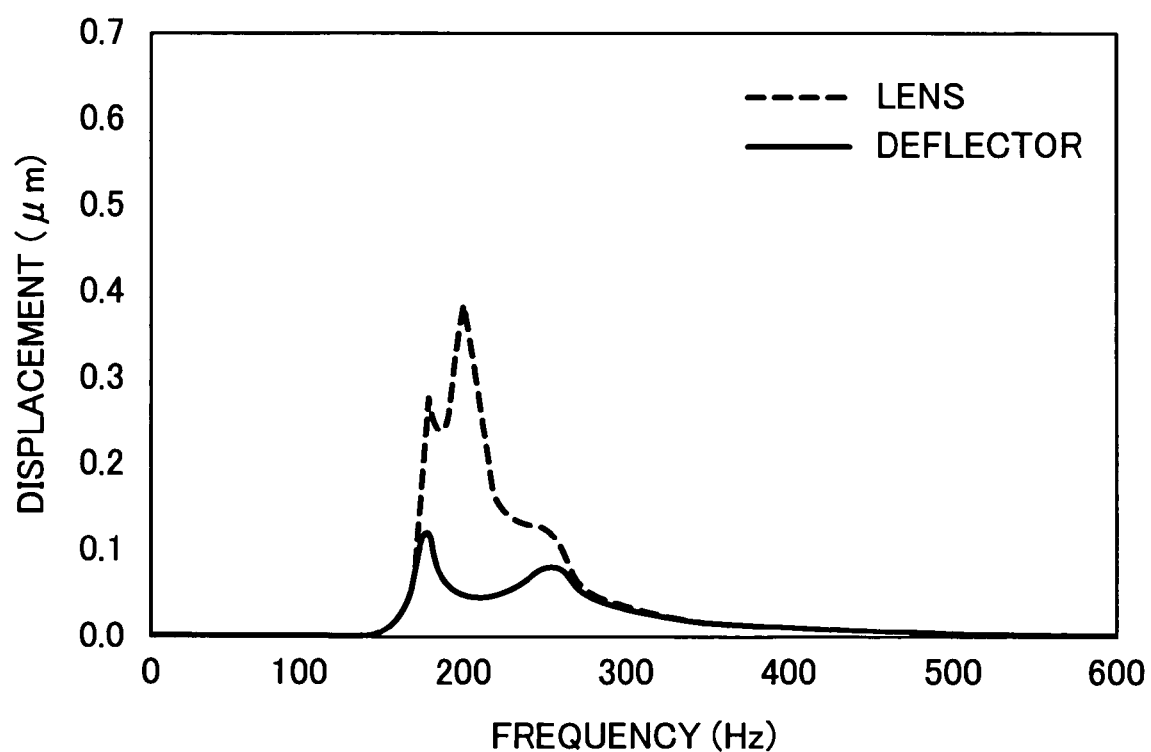
FIG. 12 is a graph of an amount of vibration displacement at measurement points in the optical box shown in FIG. 11.

Results obtained by performing the vibration simulation for the model in FIG. 11 are shown in FIG. 12. FIG. 12 is hardly different from FIG. 10. As in FIG. 10, it is seen that, compared with the optical box according to the conventional technology, height of peaks of vibration is significantly reduced in both the deflector attaching portion and the fθ lens attaching portion.

According to the present invention, the reinforcing member separate from the ribs is bridged to the discontinuous sections of the ribs formed to extend from the two walls, respectively. Thus, it is possible to improve distortion rigidity in the ribs. In particular, in the second aspect of the present invention, the reinforcing member is bridged to the ribs using an adhesive or screws to be integrally formed with the ribs. Thus, it is possible to control vibration due to presence of the discontinuous sections and prevent deterioration in an output image caused by the vibration.

According to the present invention, the discontinuous sections of the ribs are located near the deflector. Thus, it is possible to reinforce the ribs in a position where presence of an inclusion is not preferable to prevent scanning by the deflector from being hindered. It is possible to efficiently control propagation of vibration in the deflector.

According to the present invention, the space around the deflector is substantially sealed by the reinforcing member. Thus, it is possible not only to control propagation of vibration but also to efficiently control propagation of noise and heat that are generated from the deflector.

According to present invention, the reinforcing member is made of iron. Thus, it is possible to improve rigidity of the ribs, prevent noise, and emit heat easily filled in the closed space to the outside while preventing the heat from affecting the optical elements. This makes it possible to prevent a temperature increase around the deflector and prevent the optical elements from being thermally affected adversely.

According to the present invention, the sidewalls opposed to each other, the bottom surface extending substantially perpendicular to the sidewalls, and the ribs perpendicular to the bottom surface and connecting the sidewalls are provided. Openings allowing light beams made incident on and emitted from the deflector to pass through the ribs are formed integrally with the ribs. Thus, it is possible to form only a part of the ribs as the openings. Consequently, unlike passages for light beams formed by cutting opening sections in the ribs, since there are no discontinuous sections in the ribs, it is possible to prevent fall in rigidity of the ribs and maintain strength against vibration. This makes it possible to efficiently prevent deterioration in an output image due to vibration.

According to the present invention, at least the sidewalls, the bottom surface, and the ribs are integrally molded with a resin material. Thus, it is possible to reduce material cost and obtain an optical box having high rigidity at low cost while realizing improvement of rigidity of the ribs.

According to the present invention, the plurality of light sources and imaging elements are set for one deflector to use a light spot to scan a plurality of image surfaces. Thus, it is unnecessary to provide deflectors for the respective image surfaces. This makes it possible to reduce the number of components and assembly man-hour.

According to the present invention, vibration in the optical scanning device is controlled. Thus, it is possible to prevent deterioration in an output image caused by vibration.

According to the present invention, vibration in the optical scanning device is controlled. Thus, it is possible to prevent positional deviation of images when the images are superimposed one on top of another. This makes it possible to prevent deterioration in an output image like color drift.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that uses light spots to scan surfaces of image bearing members with light sources, a deflector, and imaging elements, the optical scanning device comprising:

a housing in which the light sources, the deflector, and the imaging elements are set, and wherein the housing includes at least two sidewalls opposed to each other, a bottom surface that extends substantially perpendicular to the sidewalls, and ribs that are substantially perpendicular to the bottom surface and formed to extend from the two sidewalls, respectively, and wherein the ribs are formed with discontinuous sections, and wherein the ribs include notched portions for passing respective light beams; and a reinforcing member which is separate from the ribs and bridges across the discontinuous sections, and wherein the reinforcing member is fixed to the ribs by fastening or bonding; and wherein the optical scanning device is arranged such that the light sources and the imaging elements cause the light beams to be incident on the deflector from different directions, and such that the deflector deflects the light beams to form the light spots that scan the surfaces of the image bearing members; and wherein each one of the ribs is provided with a boss at each of the four corners of the continuous section of the ribs, and wherein the reinforcing member is fixed to the ribs at the boss at each of the four corners.

2. The optical scanning device according to claim 1, wherein the discontinuous sections are located near the deflector.

3. The optical scanning device according to claim 1, wherein the reinforcing member is fixed to substantially seal a space around the deflector.

4. The optical scanning device according to claim 3, wherein the reinforcing member is a metal plate.

5. The optical scanning device according to claim 4, wherein at least the sidewalls, the bottom surface, and the ribs in the housing are integrally formed by a resin material.

6. The optical scanning device according to claim 1, wherein the imaging elements are symmetrically arranged facing each other at both sides of the deflector, and the ribs are formed to extend in parallel to a scanning direction of the deflector.

7. A color image forming apparatus that uses light spots to scan image bearing members to write images on the image bearing members to form images, wherein the image forming apparatus comprises:

an optical scanning device, which uses the light spots to scan the surfaces of the image bearing members with light sources, a deflector, and imaging elements set within a housing, and wherein the housing includes at least two sidewalls opposed to each other, a bottom surface that extends substantially perpendicular to the sidewalls, and ribs that are substantially perpendicular to the bottom surface and formed to extend from the two sidewalls, respectively, and wherein the ribs are formed with discontinuous sections, and wherein the ribs include notched portions for passing respective light beams, and a reinforcing member which is separate from the ribs, bridging across the discontinuous sections, and wherein the image forming apparatus is arranged such that the optical scanning device causes the light spots to scan the surfaces of the image bearing members to write latent images on the respective image bearing members, visualize the latent images formed on the image bearing members, and superimpose the latent images one on top of another to form a color image; and wherein each one of the ribs is provided with a boss at each of the four corners of the continuous section of the ribs, and wherein the reinforcing member is fixed to the ribs at the boss at each of the four corners.

* * * * *